June 10, 1969 L. BERMAN 3,449,690

FREQUENCY SYNTHESIZER

Filed July 26, 1967 Sheet 2 of 3

United States Patent Office 3,449,690

Patented June 10, 1969

3,449,690
FREQUENCY SYNTHESIZER

Leon Berman, Asnieres, France, assignor to C.I.T.—Compagnie Industrielle des Telecommunications, Paris, France, a French corporation Filed July 26, 1967, Ser. No. 656,166
Claims priority, application France, July 26, 1966, 70,993
Int. Cl. H03b 3/10, 3/08, 21/02
U.S. Cl. 331—4 10 Claims

ABSTRACT OF THE DISCLOSURE

A frequency synthesizer operating with a harmonic generator of high stability and a variable frequency oscillator is provided with an auxiliary fixed oscillator, whose frequency approximates a desired frequency; as the variable frequency, in the course of an exploration process, crosses the auxiliary oscillator frequency, a logical circuit is actuated, which effects the switching over from the exploration process to the synchronized state, at the moment of crossing the next harmonic frequency of high stability, i.e. the desired frequency.

*Background of the invention*

The present invention relates to devices for generating a crystal-controlled signal having a frequency of predetermined value with high precision and stability. In particular, the device according to the invention operates according to the principle employed in frequency synthesizers, but is of considerably simplified form.

It is known that, in the case of a variable frequency oscillator covering a specific range, there are two means of determining the transmission of a given frequency: First, one may employ a general method consisting of displaying or setting-up the numerical value of the required frequency on one or more mechanical elements, for example, employing a decimal display system, with switching by decades; and second, provision of a specific device dimensioned as a function of a predetermined frequency, in which the engagement performed by an action of elementary ease determines the transmission of the corresponding frequency. This represents the preset frequency method. If an apparatus is intended to supply a great number of different frequencies, with frequent changes in setting, the aforementioned general method will be utilized so that any frequency of the range covered may be preset. By contrast, the use of preset frequencies is more practical and cheaper if the number of frequencies required is smaller, with relatively infrequent changes.

An oscillator with one switchable crystal per required frequency and a single harmonic generator crystal combined with an inductance capacitance oscillator equipped with an electromechanical selector have both previously been employed to obtain preset frequencies. While the precision required in these known devices increases continually, referring for example to telegraphy on narrow bands, and to single sidebands, the said two methods yield results which are already considered to be inadequate, on the following grounds: (a) The stability of switchable quartz crystals is poor, being of the order of approximately $10^{-5}$; the stability of the quartz crystals decreases rapidly beyond 5 megacycles; generation by multiplication of a lower frequency causes intervention of parasitic oscillation. (b) The precision of the variable inductance/capacitance oscillators is inadequate; the electromechanical interlock system is too slow, requiring 30 to 60 seconds, and introduces a complementary error. The precision mechanisms are of moderate reliability. The combination between the crystal and the oscillator gives rise to interference lines and the output spectrum with frequency of $mf_1$ $nf_2$, $f_1$ and $f_2$, being the basic frequency of the crystal and oscillator.

In order to obtain frequencies with high precision, high stability and very little distortion, a synthesizer is employed in modern usage which comprises a decimal setting-up or display system, being a mechanical element acting on a so-called logic electronic circuit which has the function of performing a selection of "crystal" frequencies of the different decimal orders so that the combination serves the purpose of synchronizing an oscillator supplying a very pure wave. The variable oscillator is caused to undergo frequency exploration or scanning, which is stopped automatically on reaching the frequency set up. If advice of this nature is intended to operate by preset frequencies, it becomes necessary to contrive a logical wiring circuit for each frequency, arranged on cards or plates bearing connectable contact or terminal elements. A complex and bulky combination is formed, for example, for say ten preset frequencies. The services of an expert on logical and numerical circuits are required moreover in order to add an additional frequency to an existing combination.

*Brief description of the invention*

According to the invention, a synthesizer of simplified type comprises a voltage controlled oscillator subjected to exploration or scanning which is stopped and synchronized on a line of a spectrum of harmonics of high stability, referred to as a "crystal frequency," by means of extremely simple devices.

According to the invention, a synthesizer providing at least one preset frequency, generates a spectrum of crystal frequencies in steps $p$, with $p$ being equal to 1 kilocycle for example, includes a variable oscillator equipped with means adapted to subject the same either to a scanning sequence or to a process of synchronization on one of the lines F of the said spectrum, and an auxiliary oscillator of normal accuracy and stability operating at a frequency $f$ differing from F by less than one step $p$, means being incorporated to insure that passage of the scanning frequency through the value $f$ causes a changeover from scanning to synchronization on the adjacent frequency F.

The auxiliary oscillator for the frequency $f$ may advantageously be equipped with a crystal of normal stability such as $10^{-5}$, which is not kept under thermostatically controlled conditions. Several preset frequencies may evidently be set up by means of individual crystals.

According to another feature of the invention, the changeover from one crystal corresponding to a first preset frequency to another crystal corresponding to a second preset frequency, automatically causes a resumption of the frequency scanning operation of the main oscillator.

The invention will now be described in detail with reference to the accompanying drawings, which show one exemplary embodiment of the invention, and wherein.

*Detailed description of the invention*

Figure 1:
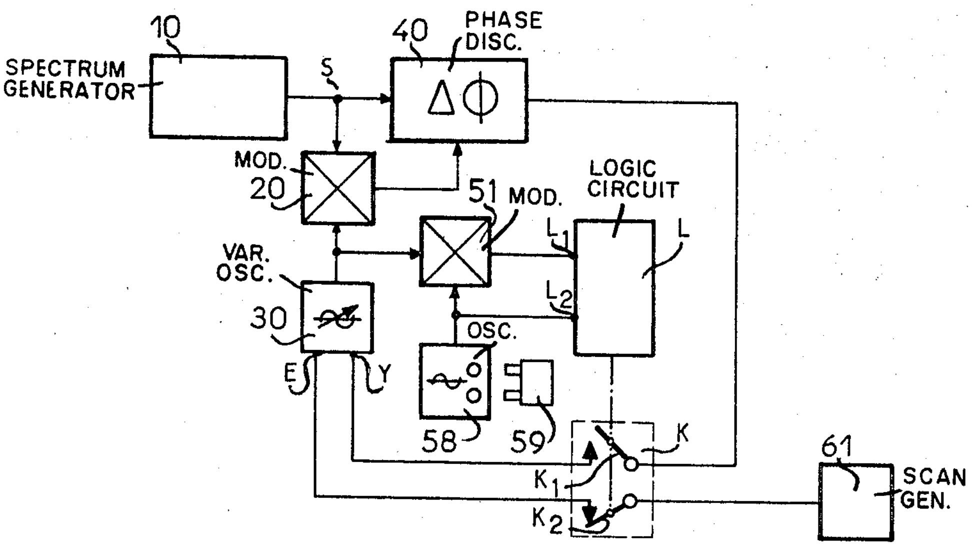
FIGURE 1 illustrates a simplified overall block diagram of a preset frequency generator according to the invention.

In FIGURE 1, a harmonic generator 10, stabilized by means of a high-stability crystal, provides a spectrum S of frequencies spaced apart by the assigned or "quantized" step $p$. This spectrum S is fed, on the one hand, to one input of a modulator 20, having another input which receives the output of a variable frequency oscillator 30 having a scanning control input E and a synchronization control input Y. The output of the modulator 20 is fed to one input of a phase discriminator 40, which also has another input receiving the spectrum S generated by the harmonic generator 10.

When a scanning voltage $V_E$ supplied by a scanning generator 61 is received at the terminal E of the oscillator 30, the frequency of the oscillator 30 passes through a range containing a preset frequency at which the oscillator is intended to operate. In the synchronized state, the oscillator 30 receives a synchronizing voltage at its terminal Y, originating from the phase discriminator, gate or "AND" circuit 40.

The output of the variable oscillator 30 is also connected to an input of a modulator 51 which has another input connected to an oscillator 58, which is equipped with an easily exchangeable crystal free of thermostatic conditioning and provides a slightly different, and for example slightly lower, frequency at a preset value determined by one of the harmonics of the spectrum S, or F–E for a preset frequency of nominal value F.

A logic circuit L, having an input $L_1$ connected to the output of the modulator 51 and an input $L_2$ connected to the output of the oscillator 58, controls the operation of a switch K comprising two contact elements $K_1$ and $K_2$. The contact element $K_1$ serves to selectively connect the phase discriminator 40 to the terminal Y of the oscillator 30. The contact element $K_2$ serves to selectively connect the scanning voltage generator 61 to the terminal E of the oscillator 30. For one condition of the logic circuit L, the contact element $K_1$ is open and the contact element $K_2$ is closed, which represents the scanning state, whereas for the other condition of the logical circuit L, the contact element $K_1$ is closed and the contact element $K_2$ is open, which represents the synchronized state.

The operation of this system evolves in the following manner: When, during a scanning operation, with the switch K in the position illustrated, the frequency of the oscillator 30 becomes equal to the output frequency of the oscillator 58, of F–E for example, the logic circuit L is energized through the input $L_1$, the contactor is switched over, the scanning action is interrupted, the frequency of the oscillator 30 is sufficiently close to the frequency F of the harmonic line of the spectrum S for "capture" of the variable frequency of oscillator 30 by the frequency F to occur through the agency of the phase discriminator 40.

If the preset frequency is to be changed, the crystal 59 may be extracted in order to be replaced by another crystal. This operation interrupts the oscillator 58, which results in feeding a signal through the input point $L_2$ causing the contactor K to return to the position illustrated so that the frequency scanning operation is resumed.

Figure 2:
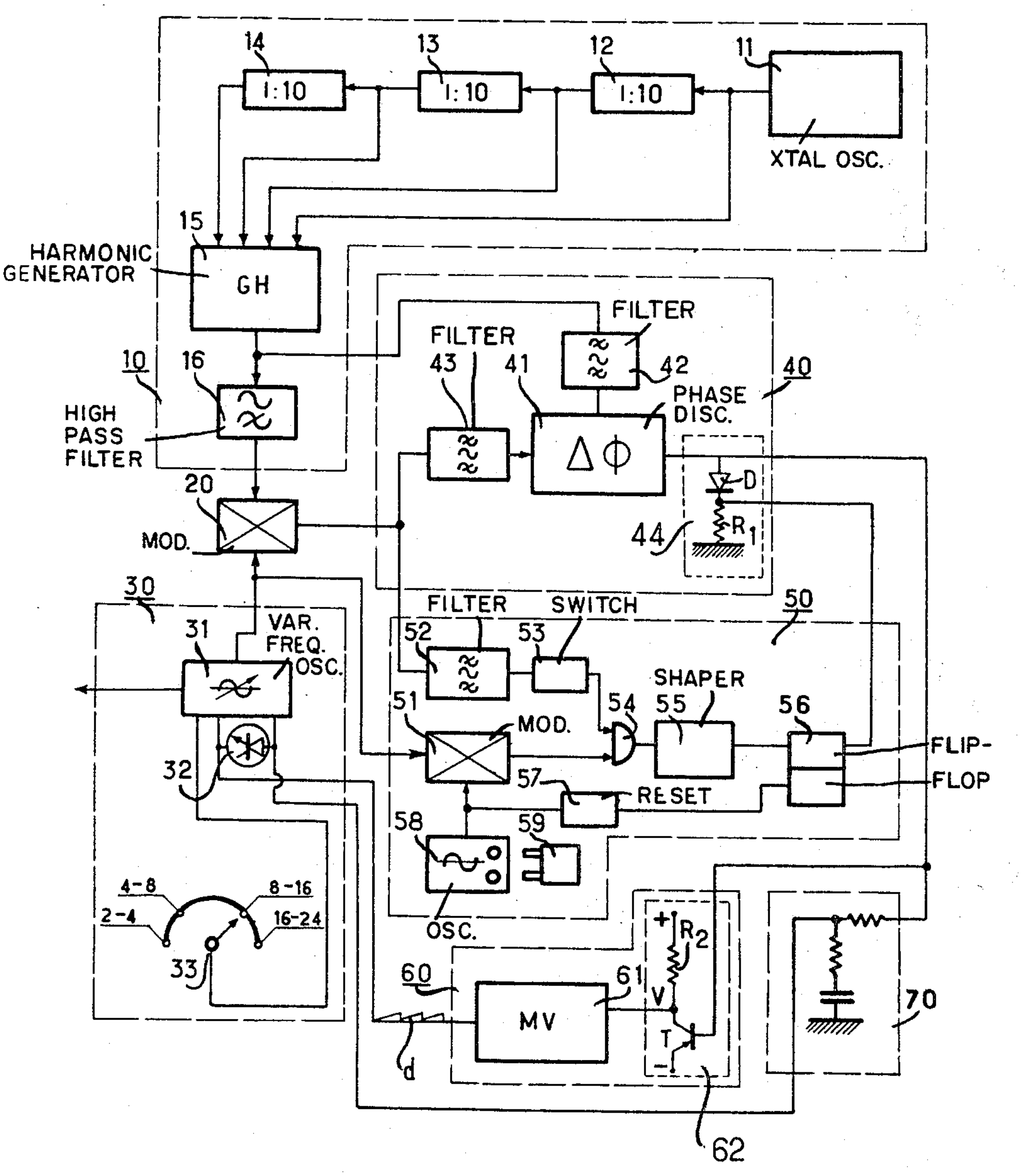
FIGURE 2 illustrates a more complete block diagram of the system of FIGURE 1.

To simplify matters by basing the description of FIGURE 2 on specific values, but without thereby adversely affecting the general scope of the invention, an oscillator will be considered, which covers a range from 2 to 24 megacycles in several sub-ranges of 2 to 4 megacycles, 4 to 8 megacycles, 8 to 16 megacycles, and 16 to 24 megacycles. The preset frequency F required in this range is assumed for purposes of the example to be equal to 8653 kilocycles. The frequency definition step $p$ is equal to 1 kc./s.

In FIGURE 2, the generator 10 is an element providing a high-stability spectrum of "crystal frequencies" covering at least the required range, and consisting of a high-stability crystal oscillator 11 operating on a frequency of 1 megacycle. Three elements 12, 13 and 14 for division of frequency by 10 provide, respectively, frequencies of 100 ks./s., 10 kc./s. and 1 kc./s. from the crystal oscillator to a harmonic generator and adder 15 providing a harmonic spectrum at 1 kc./s. steps, the portion of the spectrum lower than 2 megacycles being cut off by means of a high-pass filter 16.

One input of a modulator 20 receives the spectrum delivered by the spectrum generator 10, and another input thereof receives the frequency supplied by a main variable oscillator 30 made up of an oscillator circuit 31, a variable capacity diode or varactor 32 and a band switch 33.

A phase discriminator 40 operating at the fixed frequency of 1.6 megacycles, comprises a phase discriminator circuit 41, one input of which receives a crystal frequency $f_0=1.6$ megacycles drawn from the spectrum generator 10 through a first band pass filter 42, and a second input of which receives a variable frequency $f_1=1.6$ megacycles coming from the modulator 20 through a second band pass filter 43. A network 44 is formed by a diode D in series with a low resistance $R_1$ connected to ground which results in short-circuiting the output of the phase discriminator 41 when the diode D is conductive, and in unblocking the same when the diode D is blocked. The resistance $R_1$ may, for example, be lower in value than 50 ohms, whereas the impedance at the output of the phase discriminator may, for example, be of the order of 10,000 ohms.

An assembly 50 is provided as a logic circuit for switching off exploration or scanning, engendering the changeover of the oscillator 31 from exploration or scanning operation to synchronized operation, under conditions which are set forth below. A second modulator 51 is provided with a first input connected to the output of the oscillator 31 and a second input supplied by an auxiliary oscillator 58 equipped with exchangeable crystal 59 set, for example, to approximately 8652.5 kc./s., in principle at half spacing between two consecutive lines of the spectrum.

The output of modulator 51 is connected to an input of an "AND" circuit 54, the other input of which is connected from modulator 20 through a pass-band filter 52 centered on 10 kc./s., for example, and a monostable switching element 53. The output of the "AND" circuit 54 is connected through a monostable switching element 55 acting as a shaper to an input of a bistable switching element 56, the output of which is connected to the point shared by the diode D and the resistance $R_1$. The circuit 57, which is connected between the output of the oscillator 58 and a second input of the bistable switching element 56 resets the switching element 56 when the oscillator 58 ceases to oscillate.

A multivibrator 60, comprising a multivibrator circuit 61 and a control circuit 62 therefor, is connected for application of a scanning sawtooth voltage $d$ to a terminal of the varactor 32. Another terminal of the varactor 32 is connected to the output of the phase discriminator 41 through a dephasing or phase converter cell 70.

This same output from phase discriminator 41 is connected to the control circuit 62 of the multivibrator 61 generating the sawtooth voltage $d$, which control circuit 62 comprises a transistor T having a resistance $R_2$ in the collector circuit. When a direct voltage, assumed to be negative, issues from the phase discriminator 41, the transistor T becomes saturated and a voltage V employed to supply the multivibrator 61 through the collector of the transistor T drops to so low a value that the multivibrator ceases to operate.

For manufacturing convenience, the filter 52 is centered on approximately 10 kc./s., the value not being of critical nature, its pass-band preferably being of the order of 1 to 2 kc./s.

The operation of the system illustrated in FIGURE 2 evolves in the following manner:

At the beginning of an exploration or scanning action, the multivibrator 61 is in operation causing a sweep of the voltage output of oscillator 31, and a negative signal is applied to the diode D by the switching element 56; consequently, the diode is conductive and the phase discriminator 41, whose internal impedance may, for example, be of the order of 10,000 ohms, is practically short-circuited, the resistance $R_1$ being lower than 50 ohms.

It is assumed, for example, that the scanning action is carried out at a speed of 1 megacycle in 10 seconds, that is to say, the interval separating the passage of two harmonics of 1 kc./s. is of the order of 10 milliseconds.

When the frequency of the main oscillator 31 controlled by the output of multivibrator 61 reaches the value of the frequency of the auxiliary oscillator 58, that is to say, with $f$ equal to approximately 8652.5 kc./s., the beat signal coming from the modulator 51 energizes the monostable switching element 56 via the "AND" gate 54, which is opened for a time $\theta$ equal to approximately 12 ms. The following first beat or surge at 10 kc./s. between the frequency of the main oscillator 31 (8653) and the spectrum of harmonics (lines 8643, 8663) issuing from the modulator 20 through the filter 52, reaches the monostable switching element 56 via switching element 53 and "AND" gate 54. For its part, shaper 55 causes the bistable switching element 56 to switch over, which unblocks the phase discriminator 40. At the same time, the frequency F of the oscillator 31, having reach 8653 kc./s., provides a beat on 1.6 megacycles in discriminator 40, with the 10,253 kc./s. and 7053 kc./s. lines of the spectrum from generator 10. As a result, a direct negative voltage now issues from the phase discriminator 41, which blocks the multivibrator 61. At this point, the conditions for operation in the synchronized state have all been established.

The element 57, connected between the output of the auxiliary oscillator 58 and a second input of the bistable switching element 56, contains circuits known per se; such as a detector, logical inverter and/or others, capable of resetting the bistable switching element 56 to zero when the oscillator 58 ceases to oscillate. This occurs when the operating frequency of the apparatus is changed as a result of the crystal 59 being removed for replacement by another, at which instant the switching element 56 is reset and frequency exploration or scanning is resumed for synchronization on the new frequency.

Figure 3:
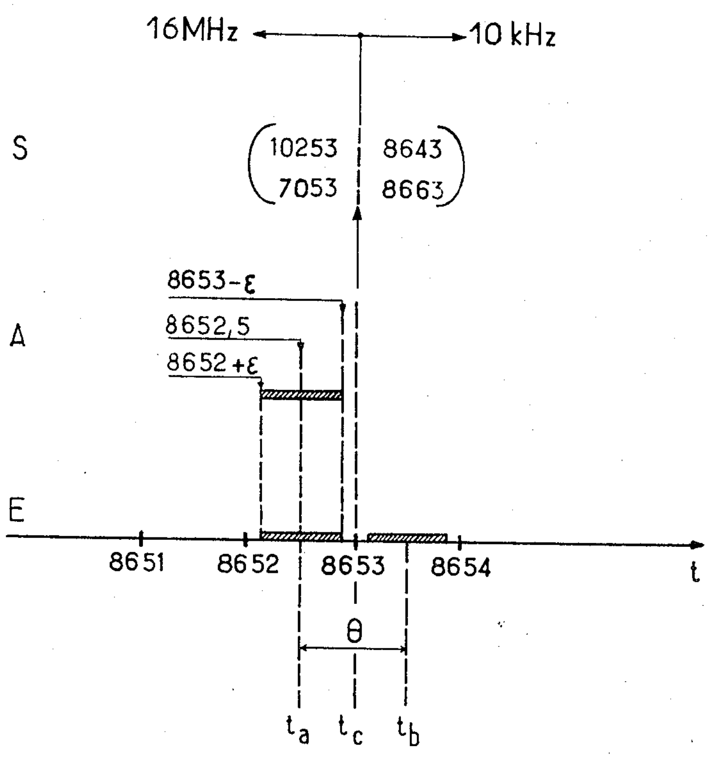
FIGURE 3 is a diagram intended to elucidate the operation of the device.

FIGURE 3 illustrates the sequence of actions as described above: The frequency of the variable oscillator 31 varies according to the line E at the bottom of the diagram, successively from 8651 to 8652 to 8653 kc./s. The frequency of approximately 8652.5 kc./s., of the auxiliary oscillator 58 is plotted at A. The lines of the spectrum of harmonics employed: 8643 and 8663 kc./s., 10253 and 7053 kc./s., are shown at S.

At the instant $t_a$ when the frequency of the variable oscillator 31 pases through the frequency of the auxiliary oscillator 58, the "AND" circuit 54 of FIGURE 1 is open and remains open until the instant $t_b$.

At the instant $t_c$, the variable oscillator 31 produces a beat at 10 kc./s., with the lines 8643 and 8663 of the spectrum: This results in conversion from the exploration or scanning condition to the synchronized condition by energization of the bistable switching element 56 of FIGURE 2. A beat at 1.6 megacycles is formed at the same time with the lines 10253 and 7053 of the spectrum after the filter 43 of FIGURE 2.

The range of tolerance for the frequency of the auxiliary oscillator (8652+E to 8653−E) and for the instants $t_a$ and $t_b$ is shown by hatched areas.

It is plain that the auxiliary oscillator has the function of opening a gate permitting passage of the initial spectrum line next in the scanning action, whose function is to insure synchronization of the main oscillator on the preset frequency.

A margin of the order of plus or minus 400 c./s. may be applied with a satisfactory margin of safety, for the frequency of the auxiliary oscillator. This corresponds to a precision of approximately $2\times10^{-5}$ for the highest frequency in the range, that is to say 24 megacycles. A very cheap conventional crystal may thus be appropriate. The frequency obtained has the precision of the reference crystal of the synthesizer, for example $10^{-7}$.

The advantages of the invention are made plain by the fact that all complex and costly circuits have been eliminated, and that simplification of the apparatus insures great reliability of the same.

The sequence described in the above represents one possible embodiment among others, and numerous modifications may be incorporated within the scope of the invention.

I claim:

1. A frequency synthesizer having at least one preset frequency equal to one frequency of a spectrum of harmonics, comprising a variable frequency oscillator, a harmonics spectrum generator of very high stability providing a spectrum of frequencies with spacing by a definition step $p$, a main modulator having the output of said variable frequency oscillator and said spectrum generator connected thereto, a phase discriminator having the output of said spectrum generator and said main modulator connected thereto to provide a control voltage assuring synchronization of the variable oscillator on the frequency of one of the harmonic lines of the said spectrum, a frequency scanning control generator, a scanning-synchronization switching device selectively connecting either said phase discriminator or said scanning control generator to said variable frequency oscillator in control thereof, said switching device including at least one auxiliary oscillator of average stability, of the preset frequency type having an exchangeable crystal providing a frequency which is systematically spaced apart from a harmonic frequency of said spectrum generator by less than a step $p$, an auxiliary modulator connected to said variable frequency oscillator and said auxiliary oscillator and logic circuit means connected to the output of the auxiliary modulator for applying the control voltage of said phase discriminator to said variable frequency oscillator in control thereof at the first harmonic after passage of the frequency of the variable oscillator through the frequency of said auxiliary oscillator, resulting in synchronization of the frequency of the variable oscillator with the harmonic of the high-stability spectrum representing the preset frequency.

2. A frequency synthesizer as defined in claim 1 wherein said frequency scanning control generator includes a multivibrator and a transistor control circuit for cutting-off said multivibrator in response to an output from said phase discriminator.

3. A frequency synthesizer having at least one preset frequency equal to one frequency of a spectrum of harmonics, comprising a variable frequency oscillator, a harmonics spectrum generator of very high stability providing a spectrum of frequencies with spacing by a definition step $p$, a main modulator having the output of said variable frequency oscillator and said spectrum generator connected thereto, a phase discriminator having the output of said spectrum generator and said main modulator connected thereto adapted to provide a voltage assuring synchronization of the variable oscillator on the frequency of one of the harmonic lines of the said spectrum, a frequency scanning control generator, a scanning-synchronization switching device selectively connecting either said phase discriminator or said scanning control generator to said variable frequency oscillator in control thereof, said switching device including at least one auxiliary oscillator of average stability, of the preset frequency type set to a frequency which is systematically spaced apart from a harmonic frequency of said spectrum generator by less than a step $p$, an auxiliary modulator connected to said variable frequency oscillator and said auxiliary oscillator and a logic circuit connected to the output of the auxiliary modulator activating the scanning-synchronization switching device during passage of the frequency of the auxiliary oscillator, resulting in synchronization of the frequency of the variable oscillator with the harmonic of the high-stability spectrum representing the preset frequency, said logic circuit essentially comprising an "AND" circuit having one input connected to the output of the auxiliary modulator and another input connected to the output of a narrow band pass filter which is connected to the output of said main modulator, and a bistable switching element connected to the output of said "AND" gate for selectively blocking and unblocking the output voltage of the said phase discriminator during the scanning and synchronization operations of said variable frequency oscillator, respectively.

4. A frequency synthesizer as defined in claim 3 wherein the output of said phase discriminator is connected to a control circuit for selectively rendering said discriminator operative and inoperative, said control circuit comprising the series combination of a diode and a resistance of low value connected between the output of said discriminator and ground, the output of said bistable switching element being connected to said diode to selectively control the conductivity thereof.

5. A frequency synthesizer having at least one preset frequency equal to one frequency of a spectrum of harmonics, comprising a variable frequency oscillator, a harmonics spectrum generator of very high stability providing a spectrum of frequencies with spacing by a definition step *p*, a main modulator having the output of said variable frequency oscillator and said spectrum generator connected thereto, a phase discriminator having the output of said spectrum generator and said main modulator connected thereto adapted to provide a voltage assuring synchronization of the variable oscillator on the frequency of one of the harmonic lines of the said spectrum, a frequency scanning control generator, a scanning-synchronization switching device selectively connecting either said phase discriminator or said scanning control generator to said variable frequency oscillator in control thereof, said switching device including at least one auxiliary oscillator of average stability, of the preset frequency type set to a frequency which is systematically spaced apart from a harmonic frequency of said spectrum generator by less than a step *p*, an auxiliary modulator connected to said variable frequency oscillator and said auxiliary oscillator and a logic circuit connected to the output of the auxiliary modulator activating the scanning-synchronization switching device during passage of the frequency of the auxiliary oscillator, resulting in synchronization of the frequency of the variable oscillator with the harmonic of the high-stability spectrum representing the preset frequency, detection-inversion means connected between the output of the auxiliary oscillator and an input of the said bistable switching element for effecting the resetting of the said switching element and the resumption of the scanning action of said variable frequency oscillator in response to disabling of said auxiliary oscillator.

6. A frequency synthesizer generating a preset frequency equal to one frequency of a spectrum of harmonic frequencies comprising, a variable frequency oscillator, a harmonic generator of very high stability providing a spectrum of frequencies equally spaced by a given step, a main modulator having inputs connected to the outputs of said harmonic generator and said variable frequency oscillator, a phase discriminator connected to the output of said harmonic generator and said main modulator providing a control voltage output for effecting synchronization of said variable frequency, a scanning generator providing a scanning voltage, and control circuit means for selectively connecting either said control voltage or said scanning voltage to said variable frequency oscillator in control thereof, said control circuit means including an auxiliary oscillator, an auxiliary modulator having inputs connected respectively to said variable frequency oscillator and said auxiliary oscillator for providing a switching output in response to detection of substantially equal frequencies being applied thereto, said control circuit means further including logic circuit means responsive to said switching output for disabling said phase discriminator, the output of said phase discriminator being connected to said variable frequency oscillator.

7. A frequency synthesizer as defined in claim 6 wherein said scanning generator includes a multivibrator and a transistor control circuit for disabling said multivibrator in response to an output from said phase discriminator.

8. A frequency synthesizer as defined in claim 7 wherein said logic circuit means includes a narrow band pass filter connected to the output of said main modulator, an "AND" gate having one input connected to the output of said auxiliary modulator and another input connected to said filter, a binary switching device having one input connected to the output of said "AND" gate for providing a first output to effect disabling of said phase discriminator.

9. A frequency synthesizer as defined in claim 8 wherein the output of said phase discriminator is connected to a control circuit for selectively rendering said discriminator operative and inoperative, said control circuit comprising the series combination of a diode and a resistance of low value connected between the output of said discriminator and ground, the output of said bistable switching element being connected to said diode to selectively control the conductivity thereof.

10. A frequency synthesizer as defined in claim 9 in which a detection-inversion means is connected between the output of the auxiliary oscillator and an input of the said bistable switching element for effecting the resetting of the said switching element and the resumption of the scanning action of said variable frequency oscillator in response to disabling of said auxiliary oscillator.

References Cited

UNITED STATES PATENTS 3,379,993 4/1968 Berman ------------- 331—19

JOHN KOMINSKI, *Primary Examiner.*

U.S. Cl. X.R.

331—19